United States Patent [19]

Hoffman

[11] 3,878,982
[45] Apr. 22, 1975

[54] AUTOMATIC TARGET MANAGEMENT METHOD AND SYSTEM

[75] Inventor: David C. Hoffman, Columbus, Ohio

[73] Assignee: Industrial Nucleonics Corporation, Columbus, Ohio

[22] Filed: Nov. 16, 1973

[21] Appl. No.: 416,456

[52] U.S. Cl......... 235/151.1; 131/22 R; 235/151.13
[51] Int. Cl.............................................. G06g 7/66
[58] Field of Search....... 235/151.3, 151.35, 151.13, 235/151, 151.1, 150.1; 131/21 B, 20 R, 22 R

[56] References Cited
UNITED STATES PATENTS

| | | | |
|---|---|---|---|
| 3,151,237 | 9/1964 | Hrabak | 235/151 B |
| 3,260,838 | 7/1966 | Anderson | 235/151.13 X |
| 3,515,860 | 6/1970 | Fitzgerald, Jr. | 235/151.13 X |
| 3,622,448 | 11/1971 | Adams et al. | 235/151.35 X |
| 3,648,035 | 3/1972 | Hart et al. | 235/151.13 X |

Primary Examiner—Joseph F. Ruggiero
Attorney, Agent, or Firm—William T. Fryer, III; C. Henry Peterson; Robert K. Schumacher

[57] ABSTRACT

The statistical dispersion of a measured property of processed material is determined by finding the difference between two discimination levels at which respective predetermined fractions of measurement signals exceed the respective levels. A signal proportional to the dispersion is additively combined with a limit signal to produce a set-point signal used to control the set point of the process. The measurement signals are made independent of the speed of the process by integrating the detection signals over a plurality of uniformly distributed periods, with the duration of each such period directly proportional to speed and the number of such periods inversely proportional to speed.

23 Claims, 5 Drawing Figures

AUTOMATIC TARGET MANAGEMENT METHOD AND SYSTEM

This invention relates to a method and apparatus for continuously and automatically controlling the properties of traveling materials such as those produced in continuous automatic manufacturing processes. More particularly, it relates to a method and apparatus for dynamically controlling a set point in accordance with the dispersion of the controlled property.

In many continuous manufacturing processes, a certain property of the processed material is controlled to maintain the property above or below a certain limiting magnitude without producing any substantial amount of material in which the property is outside the limit. It is generally desirable that the property be as close to the limit as reasonably possible without crossing the limit. Necessarily, any controlled process cannot be so closely controlled that the property is exactly the desired value. Rather, the magnitude of the property for different sections of the material is dispersed about the set point for the controlled process, the set point being the magnitude of the property at which a controller is programmed to control the property.

One process having such needs is the process of making cigarettes, wherein it is desirable that each cigarette have a tobacco content of at least a certain minimum weight. At the same time, it is desirable that each cigarette not contain any more tobacco than is reasonably necessary to assure that too many do not have a weight falling below the minimum; otherwise, an excessive amount of valuable tobacco is utilized and the resulting cigarettes might have so much tobacco as actally to be inferior in quality. Given a certain dispersion in the tobacco content of the processed cigarettes, the set point of the controller can be set above the lower limit by an amount that produces but a certain small fraction of cigarettes having lesser tobacco content. To set the set point higher would result in fewer cigarettes not meeting the standard but would utilize more tobacco. The point of diminishing returns is reached at least where the saving in defective cigarettes (even though they may be reprocessed) is not as great as the cost of the additional tobacco.

It is well known that the dispersion of a property of substantially any processed material may vary from time to time, even when the property is carefully controlled. This may be occasioned by wearing of the controlled apparatus or by changes in the makeup of the material being processed, such as density, particle size and moisture content. Further, any control will itself introduce dispersion because of inaccuracies and variations in any measuring device used for the control. Because of this variable dispersion in the property of the processed material, a single, fixed set point is not the best set point for all conditions. It is therefore known to determine the dispersion of the controlled property from time to time and then to make suitable adjustment in the set point. It has been known to perform this function automatically using appropriate computers, as shown, for example, in Fitzgerald U.S. Pat. No. 3,515,860. Such computer control has been particularly effective where a single computer is utilized to control a number of machines, processes or properties at the same time.

The present invention provides a simplified method and system particularly useful for controlling a single property of the product of a single machine or process on a continuous basis rather than on the time-sharing system particularly illustrated by Fitzgerald.

In accordance with the present invention, a property of a processed material is measured to produce measurement signals independent of the speed of the process. These measurement signals are then compared to two discrimination levels each of which is automatically adjusted until each of two given fractions of the signals exceeds the respective discrimination level. The difference in the discrimination levels is then measured as an indication of the dispersion of the measured property. A signal proportional to this difference is then developed, the proportionality factor depending upon the fraction of the material it is desired to permit to have its controlled property outside a limiting value. This proportional signal is added to a signal corresponding to the limiting value to produce a set point or target signal, or set-point offset signal, as the case may be.

It is therefore an object of the present invention to provide a method and system which automatically and continuously senses the dispersion of a measured property of processed material and automatically controls the process to maintain a given fraction of the processed material on the proper side of a limiting value.

Other objects and advantages of the invention will become apparent from the following detailed description, particularly when taken in conjunction with the appended drawings in which.

Figure 1:
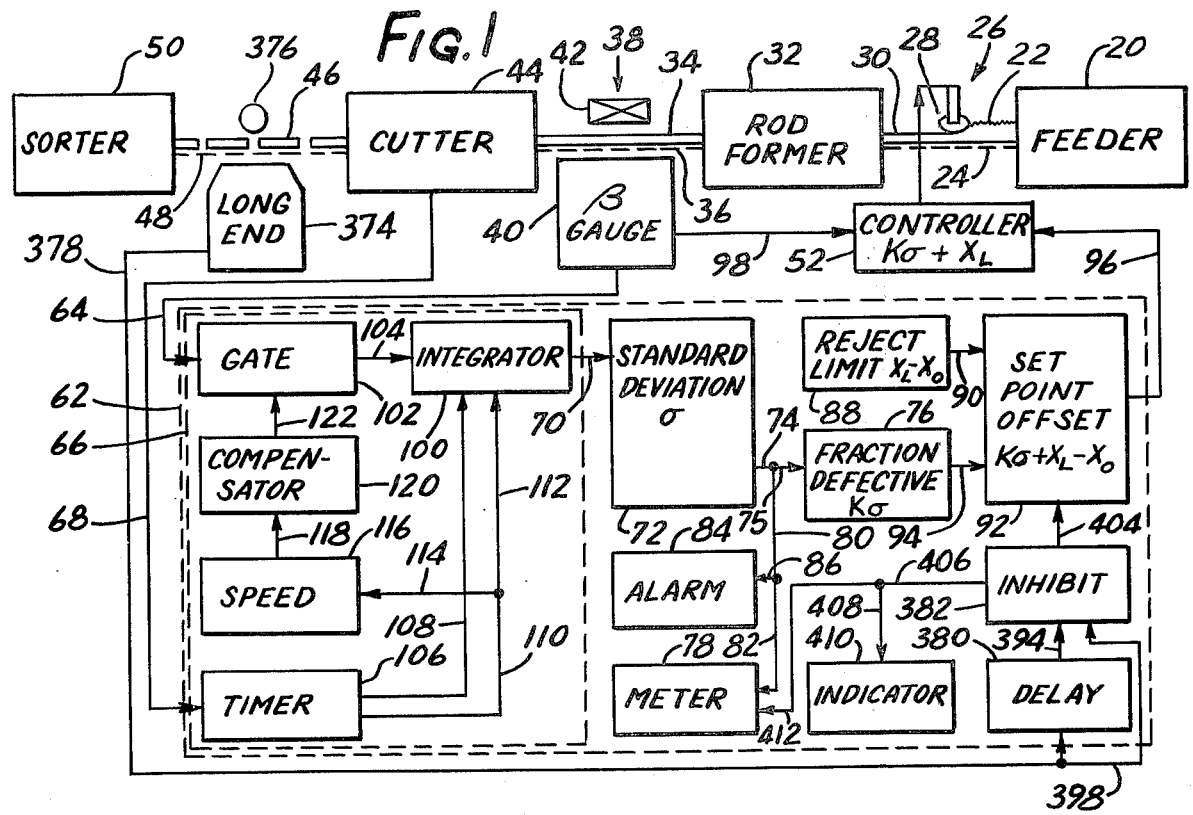
FIG. 1 is a simplified block diagram of a continuous processing apparatus utilizing the control system of the present invention.

This invention finds application in controlling substantially any controllable property of a processed product produced by a continuous process. FIG. 1 is illustrative of its application to a particular process, namely that of producing cigarettes, and more particularly for controlling mass per unit length of tobacco, i.e., the amount of tobacco in each cigarette. Referring to FIG. 1, there is shown a processing apparatus having a raw materials input or feeder 20 which supplies the raw materials, e.g., shredded tobacco, in a stream 22 by way of a conveyor 24 to a processing station 26. At the processing station 26 a property of the product is established and controlled, e.g., the mass per unit length of tobacco in the product is established by a rotating trimming knife 28 which operates in a conventional manner to control the cross section of the stream by trimming off excess tobacco to form an equalized tobacco stream 30. The equalized stream 30 is then fed through a rod former 32 which operates in a conventional manner to form the equalized tobacco stream into a cigarette rod 34 wherein the equalized tobacco stream is wrapped with the usual paper wrapper. The rod 34 is then carried by a conveyor 36 past a measuring station 38 where the property being controlled, in this example mass per unit length, is measured as by a conventional beta gauge 40. The beta gauge 40 includes a source 42 of beta rays on one side of the rod and a detector of beta rays, such as an ionization chamber, on the other side. The cigarette rod 34 is then passed through a cutter 44 which cuts the rod into individual cigarette units 46. These units 46 may be further processed to form finished cigarettes, as by adding filter tips. The cigarettes are carried by a conveyor 48 to a sorter 50 which may operate in a conventional manner to classify the product and reject or otherwise operate upon the product. For example, the sorter 50 may reject all cigarettes wherein the mass of tobacco per cigarette falls below a certain standard. The sorter 50 may take the form particularly illustrated in Groves U.S. pat. No. 3,616,901.

As is conventional in cigarette processing and other processes, the detection signal indicative of the property to be controlled is applied from the beta gauge 40 to a controller 52 where it is compared to a set point corresponding to the desired magnitude of the property being controlled. The controller develops a corresponding control signal which is applied from the controller 52 to the trimming knife 28 to reduce the difference between the magnitude of the property as detected and that corresponding to the set point of the controller.

Figure 2:
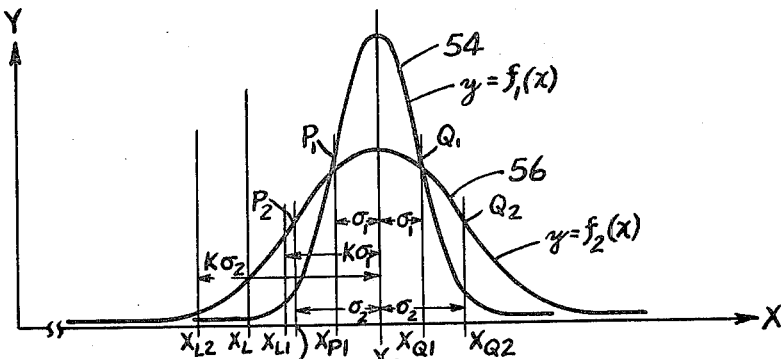
FIG. 2 is a graph showing the dispersion of a measured property of processed materials under two different conditions wherein the control set point is fixed.

The processing and control apparatus as thus far described is conventional. As is well known, the controlled property, mass per unit length, cannot be maintained at exactly the desired magnitude for a number of reasons, including variations in the properties of the raw materials such as their density, size and moisture content. Variations are also caused by looseness of the control loop and statistical errors in the detection system. The result is that there is a dispersion of the controlled property about the magnitude corresponding to the set point. This dispersion is illustrated in FIG. 2 which shows the relative number of unit lengths of each magnitude of the measured property as a function of the measured property for two different control conditions. In FIG. 2, the X axis represents the measured magnitude of the measured property, e.g., mass per unit length in the case of the cigarette processing exemplified. The Y axis represents the relative number of units having each particular magnitude of the measured property.

A curve 54 shows a condition where the property is relatively well controlled, for the mass per unit length of the respective unit lengths is in most instances relatively close to the central or average value corresponding to the set point of the controller. In the machine as thus far described, this set point is set at a nominal desired value $X_0$ by the machine operator. The curve 54 illustrates a function of $x$, $$y = f_1(x) \tag{1}$$

which is a bell-shaped curve following normal statistical distribution.

A curve 56 illustrates another function of $x$, $$y = f_2(x) \tag{2}$$

where the property is not so tightly controlled and the dispersion is therefore greater. This is indicated by the fact that the distribution is not so tight about the nominal set point value $X_0$.

In many manufacturing processes, it is more desirable that the controlled property of the processed material to maintained above a certain limit or at least that a certain measured fraction of the product be above that limit, than it is that the property be near a fixed set point. This limit is illustrated in FIG. 2 as the value $X_L$. As may be noted from FIG. 2, virtually all of the material processed under the conditions illustrated by the curve 54 is above that limit, whereas there is a substantial amount of the material processed under the conditions illustrated by the curve 56 that is below the limit. It is self evident that when a substantial amount of the processed material is below the limit $X_L$, a substantial portion of the product is defective and it would be desirable to raise the set point to control the property about a higher central point. Under the conditions of the curve 56, there is a value of $x$ indicated as $X_{L2}$ representing the point on the curve below which represents the fraction of processed material that would be acceptable to be defective. That is, the control would be satisfactory if the set point were raised from $X_0$ to such value that the point $X_{L2}$ fell at the limit $X_L$. This is illustrated by the curve 58 illustrated in FIG. 3.

Figure 3:
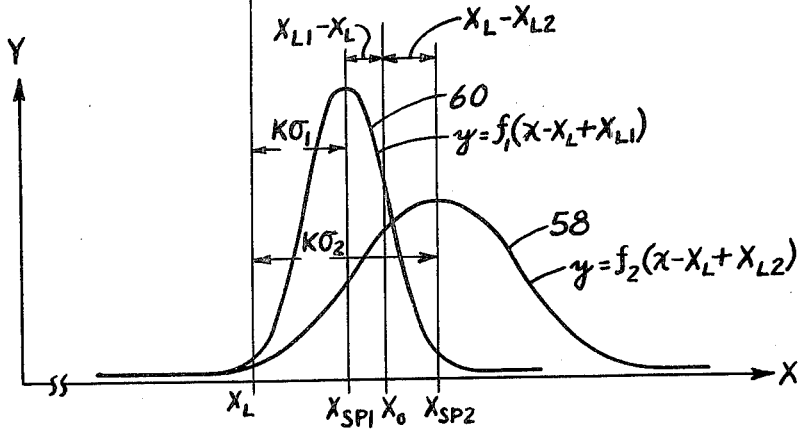
FIG. 3 is another graph showing the dispersion of the same property of the same processed materials under the same two conditions utilizing the automatic control of the present invention.

In FIG. 3, the curve 58 is identical to the curve 56 illustrated in FIG. 2 and illustrates the dispersion of the controlled property under the same conditions as illustrated by the curve 58 except that the set point, indicated as $X_{SP2}$ has been offset by an amount $\Delta X_{SP2}$ corresponding to the difference between $X_L$ and $X_{L2}$. That is:

$$\Delta X_{SP2} = X_L - X_{L2} \tag{3}$$

The adjusted set point $X_{SP2}$ for these conditions is therefore $$X_{SP2} = X_0 + \Delta X_{SP2} = X_0 + X_L - X_{L2} \tag{4}$$

The curve 58 is therefore offset to the right by the amount $\Delta X_{SP2}$ equal the difference between $X_L$ and $X_{L2}$. The curve 58 therefore illustrates the same function of $x + X_L - X_{L2}$ as the function of $x$ illustrated by the curve 56, namely, $$y = f_2(x + X_L - X_{L2}) \tag{5}$$

While not quite so self evident, the control point is set too high under the conditions illustrated by the curve 54. Under such conditions, there is an unnecessarily greater mass of material utilized than is necessary to keep the desired fraction of the processed material above the limit. For example, it may be desirable that the set point be set no higher than would cause all of the material below the point on curve 54 corresponding to the $x$ value indicated at $X_{L1}$ to fall below the limit $X_L$. That is, for economy or other reasons, it would be desirable to reduce the set point by an amount $\Delta X_{SP1}$ equal to the difference between $X_{L1}$ and $X_L$ to cause the point $X_{L1}$ to fall on the limit $X_L$:

$$\Delta X_{SP1} = X_L - X_{L1} \tag{6}$$

The adjusted set point $X_{SP1}$ for these conditions is therefore $$X_{SP1} = X_0 + \Delta X_{SP1} = X_0 + X_L - X_{L1}$$

(7)

This is illustrated by the curve 60 shown in FIG. 3 which is the same function of $x + X_L - X_{L1}$ as the function of $x$ illustrated by the curve 54, namely, $$y = f_1 (x + X_L - X_{L1})$$

(8)

For many processing operations, it is desirable that the same fraction defective be obtained under all operating conditions. This is illustrated in FIGS. 2 and 3 wherein the same fraction of the total falls to the left of the values $X_{L1}$ and $X_{L2}$, respectively. Other processes may make a more complex relationship desirable.

Under some circumstances, it is possible to make careful measurements to determine the entire curves illustrated by the curves 54 and 56 and from these curves to determine the respective points $X_{L1}$ and $X_{L2}$ marking the desired fraction defective. On the other hand, as performed in the prior art such measurements have been complicated and time consuming and not particularly accurate where the fraction defective is a very small fraction. In order to permit continuous processing, it is desirable to operate farther up on the curves where statistical variations do not cause such great percentage differences in the measurement. More particularly, it is easier to identify the points of inflection $p$ and $q$ in the respective curves illustrated as points $P_1$ and $Q_1$ of curve 54 and points $P_2$ and $Q_2$ of curve 56. For normal statistical distribution these points occur where 15.9% of the area beneath the curves is below and 15.9% is above the points $p$ and $q$, respectively, in the direction of the X axis. The $x$ co-ordinates of points $P_1$, $P_2$, $Q_1$ and $Q_2$ are $X_{P1}$, $X_{P2}$, $X_{Q1}$ and $X_{Q2}$ respectively. The points of inflection on the respective curves are the points where their second derivatives are 0. The difference between $X_0$ and a respective $x$ co-ordinate of a point of inflection equals the standard deviation $\sigma$ of a particular curve, or $\sigma_1$ and $\sigma_2$ for the respective curves 54 and 56.

For normal distribution curves, the point identifying a fraction defective is proportionally related to the standard deviation; that is, for the point $X_{L2}$ identifying a particular fraction defective for the conditions of the curve 56, the difference between $X_0$ and $X_{L2}$ bears a constant ratio K to the standard deviation $\sigma_2$:

$$X_0 - X_{L2} = K\sigma_2$$

(9)

The same ratio obtains in respect to the curve 54; that is, $$X_0 - X_{L1} = K\sigma_1$$

(10)

More generally, the same ratio obtains in respect to any conditions where the normal distribution curves apply:

$$X_0 - x_L = K\sigma$$

(11)

where $x_L$ is the $x$ co-ordinate identifying the particular fraction defective.

The amount of offset, $\Delta x_{SP}$, in respect to any conditions where the normal distribution curves apply is equal to the difference between $X_L$ and $x_L$:

$$\Delta x_{SP} = X_L - x_L$$

(12)

The corresponding set point $x_{SP}$ is therefore $$x_{SP} = X_0 + \Delta x_{SP} = X_0 + X_L - x_L$$

(13)

Substituting from equation (11)

$$x_{SP} = K\sigma + X_L$$

(14)

As stated earlier, the value $X_0$ represents the nominal set point of the controller 52. The value $X_L$ represents the fraction defective limit desirable for the particular process. K is a constant that may be empirically determined, and $\sigma$ represents the standard deviation. In accordance with the present invention, the standard deviation is measured continuously and is utilized to provide continuous control of the process by providing an offset signal to the controller 52. The apparatus for developing such control signals is an automatic target management system 62 illustrated in some detail in FIGS. 4 and 5 and indicated generally in FIG. 1.

The beta gauge 40 produces a detection signal indicating the mass of material in the gauge. This detection signal is applied over a conductor 64 to a signal processing circuit 66 within the automatic target management system 62. A signal is also applied to the signal processing circuit 66 from the cutter 44 over a conductor 68 to provide timing information to the signal processing circuit 66. The signal processing circuit 66 acts to produce a measurement signal on a conductor 70 which is indicative of the mass per unit length of the tobacco, independent of speed. The measurement signal is applied over the conductor 70 to a standard deviation calculator circuit 72 which responds to the measurement signal to produce a signal indicative of the standard deviation $\sigma$.

The standard deviation signal is applied over conductors 74 and 75 to a fraction defective circuit 76 which develops a signal $K\sigma$ proportional to the standard deviation. The proportionality factor K is selected to make the signal $K\sigma$ indicative of the fraction defective limit in accordance with equation (11):

$$X_0 - x_L = K\sigma$$

(11)

At the same time the standard deviaton signal is applied to a standard deviation meter 78 over conductors 74, 80 and 82 and to an alarm 84 over conductors 74, 80 and 86.

A reject limit circuit 88 develops a reject limit signal indicative of the offset $\Delta X_L$ of the reject limit $X_L$ from the nominal set point $X_0$, $$\Delta X_L = X_L - X_0$$

(15)

This signal is applied over a conductor 90 to a set point offset calculating circuit 92 to which a signal is also applied from the fraction devective circuit 76 over a conductor 94. The set point offset calculating circuit 92 additively combines the input signals to produce a set point signal $\Delta x_{SP}$, where $$\Delta x_{SP} = \Delta X_L + K\sigma = K\sigma + X_L - X_0$$

(16)

This signal is applied over a conductor 96 to the controller 52. The controller 52 combines the set point signal $\Delta x_{SP}$ with the nominal set point $X_0$ to provide a signal corresponding to $x_{SP}$, where $$x_{SP} = X_0 + \Delta x_{SP} = K\sigma + X_L \qquad (17)$$

This is the desired control signal, according to equation (14).

The detection signal from the beta gauge 40 is applied over a conductor 98 to the controller 52. The controller 52 then operates in a conventional manner to control the position of the trimmer 28 in such manner as to reduce any difference between the mass per unit length indicated by the beta gauge and the set point $x_{SP}$.

In the apparatus controlled by the present invention, it is desirable that the property controlled be the mass per cigarette. To this end, the mass measurement of the beta gauge 40 is integrated over each cigarette length, and a measurement signal is developed on the conductor 70 indicative of the mass of respective cigarettes. Because integration circuits normally integrate over time, the signal processing circuit 66 includes not only an integrator circuit 100 but also means for making the integrated measurement signal independent of speed. The preferred signal processing circuit 66 is illustrated generally in FIG. 1 and with particularity in FIG. 5.

The detection signal on the conductor 64 is applied to a gate 102 and thence over a conductor 104 to the integrator 100 which develop the measurement signal on the conductor 70. At the same time the signal from the cutter 44 is applied over the conductor 68 to a timing circuit 106.

The cutter 44 is mechanically synchronized to the process line. As the cutter 4 cuts the continuous tobacco rod 34 into individual cigarette units 46, the cutting strokes of the cutter may be used as timing pulses. Corresponding pulses are applied from the cutter 44 to the conductor 68. Thus, the signal applied to the timing circuit 106 comprises timing signal pulses synchronized with the process line. Normal high speed production may be 4,000 cigarettes per minute or .25 milliseconds per cigarette.

The timing circuit 106 acts in response to the timing pulses on the conductor 68 to produce timing pulses on output conductors 108 and 110 in synchronism with the process line. The signals on the conductor 110 are applied over a conductor 112 to the integrator 100. The signals on the conductor 108 are also applied to the integrator 100. Together, these signals provide synchronizing signals to assure that the output signals on the conductor 70 correspond to respective cigarette weights.

At the same time the signal on the conductor 110 is applied over a conductor 114 to a speed measuring circuit 116. The speed measuring circuit 116 produces an output signal on a conductor 118 indicative of speed. More particularly, in the circuit illustrated, the output signal on the conductor 118 is inversely proportional to speed.

The speed signal is applied to a speed compensating circuit 120 to produce periodic gating pulses at a frequency high relative to the frequency production of the individual cigarettes 46. The duration of each gating pulse is inversely proportional to the speed signal and hence is directly proportional to speed.

These gating signals are applied over a conductor 122 to the gating circuit 102 whereby the detection signal on the conductor 64 is passed to the integrator 100 periodically at this same frequency for the same duration of time.

With the gating circuit thus gated, the integrator 100 accumulates the individual gated detection signals over each cigarette unit under the control of the timing signals from the timing circuit 106. As the gating frequency is constant, the number of gating signals per cigarette is inversely proportional to speed. Since the duration of each gating pulse is proportional to speed, the total duration of gating pulses over a cigarette remains constant, independent of speed. With the accumulated integration time for each unit being constant, the integrated measurement signal is independent of the speed of the process.

Figure 5:
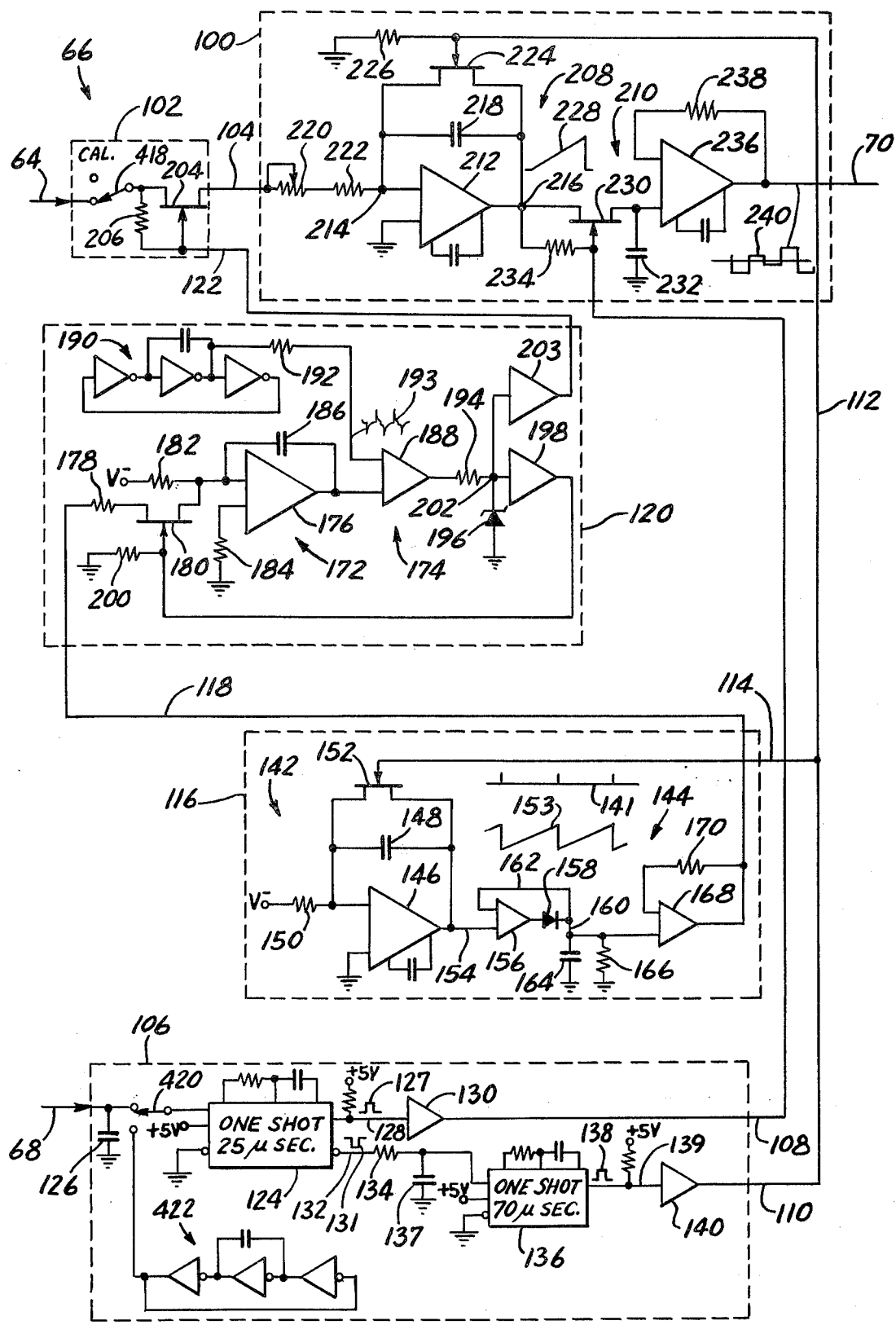
FIG. 5 is a diagrammatic illustration of the signal processing circuitry of the control system of FIGS. 1 and 4, providing measurement signals independent of the speed of the process.

Referring now more specifically to FIG. 5, the synchronizing cigarette pulses from the cutter 44 are applied over the conductor 68 to a one shot multivibrator 124. To reduce the effect of transients, a capacitor 126 may be connected across the input of the one shot multivibrator. The one shot multivibrator 124 may conveniently produce a pulse having a duration of 25 microseconds in response to each synchronizing pulse from the cutter 44. A 25 microsecond pulse indicated by the wave form 127 is produced on an output conductor 128. This pulse is applied through an amplifier 130 to conductor 108. At the same time, a corresponding opposite going 25 microsecond pulse indicated by the wave form 131 is developed on the other output conductor 132 of the one shot multivibrator 124. This pulse is applied through a resistor 134 to the input terminal of a second one shot multivibrator 136. The input terminal is connected to ground through a capacitor 137. The input is therefore delayed for a short time by the combined effect of the resistor 134 and the capacitor 137. The trailing edge of each pulse 131 triggers the multivibrator 136 which produces a single pulse of a particular duration as indicated by the wave form 138. The duration of each pulse 138 of this one shot multivibrator may conveniently by 70 microseconds and is developed on a conductor 139. This pulse is applied through an amplifier 140 to the conductor 110. Thus, a 25 microsecond pulse on the conductor 108 is followed shortly thereafter by a 70 microsecond pulse on the conductor 110.

A respective pulse occurs upon each cutting operation, and hence the time between pulses is inversely proportional to the speed of the process. The pulses 138 are applied over the conductor 114 to the speed measuring circuit 116, as indicated by the wave form 141. The speed measuring circuit 116 comprises a ramp generator 142 and a peak-reading circuit 144. The ramp generator comprises a feedback amplifier 146 with a feedback capacitor 148 connected between its output and input terminals. A constant voltage input is applied through a resistor 150. A gate in the form of a field effect transistor (FET) 152 is connected across the capacitor 148. The gate of the transistor 152 is connected to the conductor 114 whereby the FET 152 is rendered conductive upon the application of the pulses 141. The ramp generator thus operates in a conventional manner to generate a ramp voltage at the output of the amplifier 146. Each ramp begins when the FET 152 is rendered non-conductive and terminates with the application of the next pulse 138 which acts to discharge the capacitor 148. The ramp wave form is thus in synchronism with the timing pulses, as shown by wave form 153. As the ramp voltages rise substantially linearly, the peak voltages are proportional to the time between pulses 138 and hence are inversely proportional to the speed of the process.

The output of the amplifier 146 is applied over a conductor 154 to one input of a differential amplifier 156 which is part of the peak-reading circuit 144. The output of the amplifier 156 is applied through a diode 158 to an output conductor 160. The output is fed back from the conductor 160 over a conductor 162 to the other input of the differential amplifier 156. Thus, the diode 158 conducts whenever the voltage on the conductor 154 exceeds the feedback voltage on the conductor 162. A capacitor 164 is connected between the conductor 160 and ground and a resistor 166 is connected in parallel with the capacitor 164. Thus, the signal voltage on the conductor 160 is the peak voltage generated by the ramp generator 142 and inversely proportional to speed. This signal is applied through a buffer amplifier 168 to the conductor 118. The buffer amplifier may be in the form of a differential amplifier with one input connected to the conductor 160 and the other input connected through a feedback resistor 170 from the output of the buffer amplifier.

The speed signal on the conductor 118 inversely proportional to speed is applied to the compensating circuit 120. The primary components of the compensating circuit are a summing integrating circuit 172 and a comparison circuit 174. The summing integrating circuit 172 includes a differential amplifier 176. The speed signals on the conductor 118 are applied through a resistor 178 in series with a gated field effect transistor 180 to one input terminal of the differential 176. A fixed voltage is applied through a resistor 182 to the same input terminal. The other input terminal of the amplifier 176 is connected to ground through a resistor 184. A capacitor 186 is connected between the output terminal of the amplifier 176 and the first input terminal. As thus connected, the output of the amplifier 176 corresponds to the sum of the currents applied through the respective resistors 178 and 182. The polarity of the fixed voltage is such that these currents are flowing oppositely.

The output of the summing integrating circuit 172 is applied to the comparison circuit 174. The comparison circuit includes a differential amplifier 188. The output of the amplifier 176 is applied to one input terminal of the amplifier 188. A comparison signal is developed by an oscillator 190 and applied through a resistor 192 to the other input teminal of the differential amplifier 188. The output of the oscillator 190 may be as shown by the wave form 193 and may have almost any wave shape except square. The polarity of the output of the amplifier 188 depends upon the magnitude of the output of the differential amplifier 176 relative to the output of the oscillator 190. The output of the amplifier 188 is applied through a resistor 194 to a Zener diode 196. The Zener diode 196 grounds the part of the cycle of the output of the amplifier 188 during which the output of the differential amplifier 176 is greater than the oscillator signal. With relatively large gain in the amplifier 188, the Zener diode maintains a substantially constant voltage level during the remaining part of the cycle. This voltage is applied through an amplifier 198 to the gate electrode of the FET 180. The gate electrode is connected to ground through a resistor 200.

As thus connected the gate FET 180 is rendered conductive periodically at the frequency of the oscillator 190. This frequency is high relative to the rate of production of cigarettes and may, for example, be 50 kilohertz. The duty cycle of the gate FET 180, as determined by the feedback from the amplifier 198, makes the average current through the resistor 178 equal and opposite to the steady current through the resistor 182. If the speed of the process changes, the signal on the conductor 118, being inversely proportional to speed, changes oppositely. This creates an imbalance between the currents flowing through respective resistors 178 and 182 and changes the signal level at the output of the amplifier 176. This correspondingly changes the relative magnitudes of the two signals applied to the comparison circuit 174 and produces a change in the duration of the pulses at the input terminal 202 of the amplifier 198. This changes the duty cycle of the gate FET 180 until the currents through the resistors 178 and 182 are equalized. Thus, the duration of each pulse produced at the terminal 202 is proportional to speed. These pulses are applied through an amplifier 203 to the conductor 122.

The detection signal from the beta gauge 40 is applied to the gate 102 on the conductor 64. The gate 102 comprises an FET 204 with its source electrode connected to the conductor 64 and its drain electrode connected to the conductor 104. Its gate electrode is connected to the conductor 122. A resistor 206 is connected between the source and gate electrodes. Thus, the detection signal on the conductor 64 is applied to the conductor 104 periodically at the frequency of the ocillator 190 for respective times proportional to the speed of the process.

The gated detection signal is applied to the integration circuit 100 on the conductor 104. The integration circuit 100 comprises an integrating amplifier 208 and a sample and hold circuit 210. The integrating amplifier 209 includes an amplifier 212 having an input terminal 214 and an output terminal 216 with a capacitor 218 connected between the two. The gated detection signal on the conductor 104 is applied through a variable resistor 220 and a fixed resistor 222 to the input terminal 214. The output signal developed on the output terminal 216 thus is an integration of the total applied gated detection signal. A gate FET 224 is connected between the input terminal 214 and the output terminal 216.

The gate electrode of the FET 224 is connected to ground through a resistor 226. The gate electrode is also connected to the conductor 112 to receive the timing pulses. Thus, the timing pulses determine the integrating period of the integrating amplifier 208. Each timing pulse short-circuits the capacitor 218 and discharges it. Upon termination of a timing pulse on the conductor 112, the gate FET 224 is rendered nonconductive and the capacitor 218 begins to charge. The total charging interval is the interval between timing pulses and hence is inversely proportional to speed. On the other hand, the gate FET 204 conducts for respective intervals that are directly proportional to speed at a frequency that is independent of speed. Thus, any change in the integrating interval as determined by the time between timing pulses on the conductor 112 is exactly counterbalanced by an increase in the individual periods of conduction of the gate FET 204 so that the effective total integrating period and hence the integrated signal at the output terminal 216 are substantially independent of speed. This is true for all speeds up to some limiting speed where the duration of a gating pulse at the FET 204 extends to the next succeeding pulse. The duration of these pulses is calibrated to make this limiting speed higher than any speed likely achieved in the particular process.

As the frequency of the oscillator 190 is very high relative to the frequency of the timing pulses on the conductor 112, the integrated measuring signal at the output terminal 216 is in the form of a ramp wave form 228, with a period delimited by successive timing pulses on the conductor 112. The peak of this wave form is a measure of the average mass per unit length over the measuring interval. Because the interval is delimited by the timing pulses, this interval corresponds to one cigarette length. The sample and hold circuit 210 samples this sample at its peak or very near its peak.

The sampling is done with a gate FET 230 which connects the output terminal 216 to one side of a grounded capacitor 232. The gate electrode of the FET 230 is connected to the output terminal 216 by a resistor 234. The gate electrode is also connected to the conductor 108 to receive the timing pulses thereon. As previously described, the 25 microsecond pulses on the conductor 108 precede corresponding 70 microsecond pulses on the conductor 112 by the delay occasioned by the delay circuit formed by the resistor 134 and the capacitor 137. Thus, the timing pulses on the conductor 108 cause the FET to apply the measuring signal at the terminal 216 to the capacitor 232 just prior to the peak of the wave form 228. The FET 230 is rendered non-conductive prior to the corresponding pulse on the conductor 112 and hence prior to the beginning of a new integration cycle. Thus, the capacitor 232 remains charged to near the peak of the wave form 228 until the next succeeding wave form is developed and sampled by the FET 230.

The signal on the capacitor 232 is applied through a buffer amplifier 236 to the conductor 70. As shown, the buffer amplifier 236 may comprise a differential amplifier circuit with a feedback resistor 238 connected from its output terminal to one of its input terminals. The signal on the capacitor 232 is applied to the other terminal of the differential amplifier 236. The signal on the conductor 70 therefore comprises a series of pulses as indicated by wave form 240, each corresponding to a respective cigarette length. The duration of each pulse is the time between timing pulses, and the height of each pulse corresponds to the measured property, that is, mass per unit length, for each respective cigarette interval.

The measurement signals on the conductor 70 are applied through resistors 242 and 243 to first and second discriminators 244 and 245. Each discriminator 244, 245 as illustrated, comprises a differential amplifier 246 having first and second input terminals 248 and 250 and an output terminal 252. The measuring signal is applied to the first input terminals 248, and first and second threshold signals are applied to the respective second input terminals 250. These threshold signals determine the discrimination levels of the respective discriminators. The manner in which these threshold signals are developed will be described further below. For the moment, it is sufficient to know that the polarity of the signal developed at the respective output terminal 252 depends upon whether the measuring signal is above or below the respective threshold signal.

Voltage limiters 254 and 256 are connected between each of the respective output terminals 252 and ground. Each voltage limiter 254 comprises a Zener diode 258 in series with an oppositely poled diode 260. The voltage limiter 254 conducts when the potential at the terminal 252 goes positive by the amount of the breakdown voltage of the Zener diode 258. Each voltage limiter 256 includes a Zener diode 262 in series with an oppositely poled diode 264. In this case, the Zener diode 262 is poled oppositely to the Zener diode 258 so that the Zener diode 262 conducts when the potential on the output terminal 252 goes relatively negative by the amount of the breakdown voltage of the Zener diode 262. The gain of the amplifier 246 is made relatively high so that the signals developed at the output terminals 252 are in one or the other of but two conditions, that is, positive or negative by the breakdown potentials of the respectiv Zener diodes 258 and 262. The signals at the respective terminals 252 are therefore positive or negative by predetermined amounts for respective intervals, depending upon whether the measurement signals at the input terminals 248 are below or above the respective threshold signals. The signals at the terminals 252 will thus be square waves, as indicated by wave forms 266 and 267.

The signal on a terminal 252 is applied through a resistor 268 to an input terminal 270 of an integrating summing amplifier 272 having an output terminal 274 and a capacitor 276 connected between the output terminal 274 and the input terminal 270. A first fraction signal is developed at the tap 278 of a potentiometer 280 connected to a fixed positive voltage source through a resistor 282. At the same time a second fraction signal is developed at the tap 278 of another potentiometer 280 connected to a fixed negative voltage source through a second resistor 282. The first and second fraction signals are applied through respective resistors 283 to the respective input terminals 270. Each summing intergrating amplifier 272 thus operates to add the average of the signals developed at a respective output terminal 252 to the respective first or second fraction signal determined by the setting of the tap 278 of the respective potentiometer 280 and accumulates the added signals on the respective capacitor 276. The output signals on the respective terminal 274 is fed back to the respective second input terminal 250 as the respective first or second threshold signal.

For reasons that will become apparent, with this feedback of the first threshold signal, the first threshold signal will adjust to whatever value causes the average value of the signal developed by the first discriminator 244 at the respective terminal 252 to offset the first fraction signal as set by adjustment of the respective tap 278. As the signal illustrated by wave form 266 can have but two values, its average value depends upon the relative amount of time that the applied measuring signal at the terminal 248 is below the first threshold signal. The feedback providing the first threshold signal thus produces a first threshold signal that is above the measurement signal for just that fraction of time as determined by the setting of the respective potentiometer 280.

As the applied measuring signal at the terminal 248 is in the form of pulses of uniform duration with each pulse signifying the mass of each respective cigarette length as indicated by the wave form 240, the first threshold signal is above the measurement signal for this same fraction of the total number of cigarettes. The first threshold signal itself is therefore an indication of the X co-ordinate of the point on a respective curve as illustrated in FIG. 2 below which falls that particular fraction of the area under the curve.

Similarly, in respect to the second threshold signal, the second threshold signal provides an indication of the X co-ordinate for the point on the curve below which falls the area equal to a different fraction of the total area under the curve. Conveniently, the first and second fraction signals are set for fractions of 15.9% and 84.1%, respectively, whereby the first and second threshold signals provide measurements of the X co-ordinates $x_P$ and $x_Q$ at the points of inflection of the curves whereby the difference in the two signals provides a measure of the standard deviation and in fact for normal distribution may be taken to represent $2\sigma$. Taking the conditions of the curve 54 as an example, the first threshold signal may be taken as a measure of the X co-ordinate $X_{P1}$ and the second threshold signal may be taken as a measure of the X co-ordinate $X_{Q1}$ whereby the difference is equal to $2\sigma_1$, the general equation being $$x_Q - x_P = 2\sigma$$

(18)

The first threshold signal is applied through a resistor 284 to one input terminal 286 of a differential amplifier 288. The second threshold signal is applied through a corresponding resistor 290 to the other input terminal 292 of the differential amplifier 288. A capacitor 294 in parallel with a resistor 296 is connected between the output terminal 298 of the differential amplifier 288 and the second input terminal 292. A corresponding capacitor 300 in parallel with a corresponding resistor 302 is connected between the first input terminal 286 and ground. This provides an integrating differential amplifier whereby the signal developed at the output terminal 298 is a measure of standard deviation $\sigma$ over a reasonable period of time, such as 8.8 seconds, as determined primarily by the relative capacitances and resistances of the capacitors 294 and 300 and resistors 296 and 302.

This signal indicative of standard deviation $\sigma$ may be applied over the conductors 74, 80 and 82 to the meter 78. The signal applied over the conductor 82 is applied through an input resistor 304 and a gate FET 306 to an indicator 308. The operation of the gate FET 306 will be discussed further below. Suffice to state at this point that whenever the gate FET 306 is conducting, the indicator 308 indicates the standard deviation $\sigma$.

At the same time, the standard deviation signal is applied over conductors 74, 80 and 86 to the alarm circuit 84. As illustrated, the signal may be applied through a resistor 310 to one input of a differential amplifier 312. The other input of the differential amplifier 312 is connected to a potentiometer 314 which is connected to a fixed negative potential. The output of the differential amplifier 312 is applied through a diode 316 to a lamp 318 or other means for indicating an alarm condition. The potentiometer 314 sets a threshold limit for the alarm, whereby when the standard deviation signal $\sigma$ applied at the conductor 86 exceeds the threshold, the diode 316 passes a signal to the lamp 318 to indicate an alarm condition. The level for an alarm condition is set by the potentiometer 314.

As stated above, the desired fraction defection for normal dispersion of measurements is proportional to the standard deviation, Fraction Defective = $K\sigma$ (19)

What this factor of proportionality K should be depends upon various economic factors relating to the particular operation and the costs and qualities of the raw materials and finished product. To introduce this factor of proportionality K, the standard deviation signal $\sigma$ is applied over conductors 74 and 75 to the fraction defective circuit 76 which may consist simply of a variable series resistor 320. If desired, this resistor 320 may be connected for remote control. In any event, the output of the fraction defective circuit 76 appearing on the conductor 94 represents $K\sigma$, where K is the proportionality factor as determined by the adjustment of the variable resistor 320.

The reject limit circuit 88 may, as shown, include a potentiometer 322 connected to a fixed negative potential. The output of the potentiometer 322 is applied through a fixed resistor 324 to one input terminal of a differential amplifier 326. The other input of the differential amplifier 326 is connected to ground through a fixed resistor 328. A variable resistor 330 is connected between the output terminal and the first input terminal of the differential amplifier 326. Given a nominal set point $X_0$ of the controller 52, the variable resistor 330 is adjusted to provide the reject limit signal on the output conductor 90 corresponding to $\Delta X_L$ in accordance with equation (15), $$\Delta X_L = X_L - X_0$$

(15)

where $X_L$ is the lower limit indicated in FIGS. 2 and 3.

The signals on conductors 90 and 94 are applied to the set point offset circuit 92 which includes an integrating differential amplifier 332. The reject limit signal $X_L - X_0$ is applied over the conductor 90 through an input resistor 334 to one input terminal of the amplifier 332. The output $K\sigma$ of the fraction defective circuit is applied from the conductor 94 through an input resistor 336 to this same input terminal. The other input terminal of the amplifier 332 is connected to ground through a resistor 338. A feedback resistor 340 is connected between the output terminal of the amplifier 332 and the first input terminal. The output terminal is also connected to the output conductor 96. A gate FET 342 is connected across the resistor 340. When the FET 342 is non-conductive, the signal appearing on the conductor 96 corresponds to the sum of the signals on conductors 90 and 94 and therefore corresponds to the set point signal indicative of set point offset $\Delta x_{SP}$ according to equation (16), $$\Delta x_{SP} = K\sigma + X_L - X_0$$

(16)

This signal on the conductor 96 is applied to the controller 52 as an offset from the nominal set point $X_0$ to provide the control signal $x_{SP}$, where $$x_{sp} = K\sigma + X_L \quad (17)$$

as desired to control the process at the processing station 26.

For many processing lines, it is desirable that the control remain within certain limits of the nominal set point irrespective of what the automatic target management system would otherwise require. That is, no matter what the automatic target management system 62 may indicate, it would be undesirable that the set point signal on the conductor 96 exceed certain limits either positively or negatively. For example, it might be desirable that the average cigarette rod not be made smaller or larger than a certain physical dimension no matter what the dispersion of the measured property might be. To this end, a negative target limit circuit 344 and a positive target limit circuit 346 are provided to limit the signal $\Delta x_{sp}$.

The negative target limit circuit 344 comprises a negative target reference potentiometer 348 coupled to a fixed source of negative potential. The output of the potentiometer 348 applies a selected negative target limit potential to one input of a differential amplifier 350. The other input terminal of the amplifier 350 is connected through a resistor 352 to the anode of a diode 354, the cathode of which is connected to the conductor 96. A resistor 356 is connected from the output of the differential amplifier 350 to the anode of the diode 354. The output of the differential amplifier 350 is connected to the base of an NPN transistor 358, the collector of which is grounded and the emitter of which is connected to the anode of the diode 354. The negative target limit circuit 344 as thus connected serves to clamp the signal on the conductor 96 at the negative target limit potential set by the potentiometer 348 whenever the signal on the conductor 96 would otherwise go below this limit.

The positive limit circuit 346 functions similarly to clamp the signal on the conductor 96 at a positive target limit potential whenever the signal would otherwise exceed this limit. The positive target limit circuit 346 includes a potentiometer 360 connected to a fixed positive potential. The output of the potentiometer 360 is applied to one input terminal of a differential amplifier 362. The other input of the differential amplifier 362 is connected through a resistor 364 to the cathode of a diode 366. The anode of the diode 366 is connected to the conductor 96. A resistor 368 is connected from the cathode of the diode 366 to the output of the differential amplifier 362. The output of the differential amplifier 362 is also connected to the base of a PNP transistor 370, the collector of which is connected to ground and the emitter of which is connected to the cathode of the diode 366.

Although the circuit as thus far described is a complete operating control circuit, it often happens that during start-up transients would cause errors in the control. It is therefore desirable that the automatic target management system 62 be disabled for a certain period following start-up. This is the function of the FET 342, the gate electrode of which is connected to ground through a resistor 372. When production begins, production is indicated by a sensor 374 (FIG. 1). In the case of the cigarette-making machine the sensor 374 may be a so-called long end sensor which senses the production of cigarettes by noting the spaces between the individual cigarettes. This may be by viewing a lamp 376 disposed on the opposite side of the cigarettes. Conveniently, the long end sensor 374 may comprise a photocell producing electrical pulses upon the passage of the gaps between cigarettes. These electrical pulses may be accumulated on a capacitor of an integrating circuit so that a signal indicating the production of cigarettes for the operation of the particular process is developed on a conductor 378. This signal indicating production is applied to a delay circuit 380 and an inhibiting circuit 382.

Figure 4:
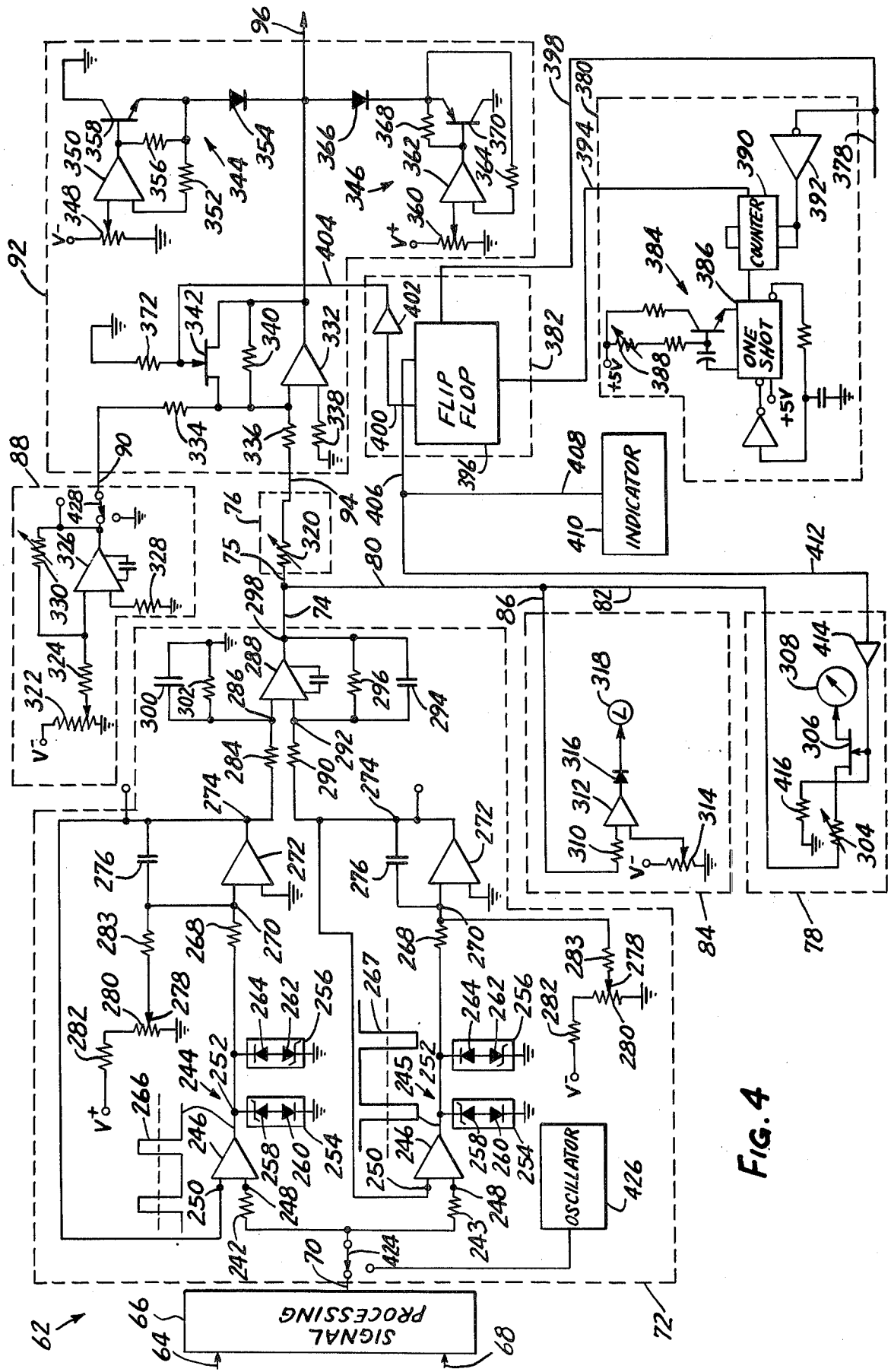
FIG. 4 is a diagrammatic illustration of the automatic control system of the apparatus of FIG. 1, providing automatic target management.

As shown in FIG. 4, the delay circuit 380 may comprise an oscillator 384 having a period of several seconds. The oscillator 384 may, as shown, include a one-shot multivibrator 386 with appropriate conventional circuitry for adjusting its period, including a variable resistor 388. The output of the oscillator 384 is applied to a counter 390 which is reset by the signal applied from the conductor 378 through an inverter 392. Thus, upon the appearance of a signal on the conductor 378 indicating that production is under way, a pulse is produced on a conductor 394 connected to the output of the counter 390 after a delay determined by the period of the oscillator 384 and the number of counts in the cycle of the counter 390.

The inhibit circuit 382 may comprise a flip-flop circuit 396 which is reset by the signal applied from the conductor 378 over a conductor 398. When the flip-flop circuit 396 is reset, it produces a control signal on one of its output conductors 400. The control signal is applied through a buffer amplifier 402 to a conductor 404 which is connected to the gate of the FET 342. The FET 342 is thereby rendered conductive thus inhibiting or inactivating the automatic target management system 62 and causing the controller 52 to operate at its nominal set point $X_o$. After the delay occasioned by the delay circuit 380, the pulse appearing on the conductor 394 triggers the flip-flop circuit 396 and reverses the conditions of the output terminals of the flip-flop circuit 396. The change in the state of the flip-flop circuit 396 reverses the signal on the conductor 404 and places the FET 342 in its non-conducting state, whereupon the automatic target management system 62 goes into its controlling mode as described above.

The other output of the flip-flop circuit 396 is of the opposite sense. It is applied over conductors 406 and 408 to an indicator circuit 410. The indicator circuit 410 may include an indicator lamp turned on whenever the automatic target management system 62 is in its control mode. At the same time, a signal is applied over conductors 408 and 412 to the meter 78. The signal is applied through a buffer amplifier 414 to the gate electrode of the FET 306 to render the FET 306 conductive only after the delay occasioned by the delay circuit 380. This assures that erroneous measurements of standard deviation are not noted or recorded until after start-up transients have dissipated. The gate electrode of the FET 306 is also connected to ground through a resistor 416.

The circuitry for a preferred embodiment of the present invention has been set forth, identifying the components and describing their function. The selection of particular components and their values may be in accordance with the skill of the art. In this respect, the respective computational operations not described in detail may be performed conventionally. The values of various resistors and other components may be selected in a well-known manner to perform the desired computation. More particularly, in the case of an adding operation, as by the amplifier 332, the relative values of the input resistors are selected to provide the proper constants for addition of the functions represented by the respective input signals.

Further, it is to be noted that subtraction of two signals may be achieved by inverting one of the signals and adding, and that addition may be achieved by inverting a signal and substracting. Thus, when the combination of the first and second threshold signals is stated to be by differentially combining the signals, this encompasses any means or method for combining the signals to provide a signal indicative of the difference in the physical properties they correspond to, for example, $x_q - x_p$. Similarly, the combination of the signal indicative of dispersion $K\sigma$ with the limit signal $X_L - X_0$ is stated to be by additively combining, which encompasses any means or method for combining the signals to provide a signal indicative of their combination in equation (16)

$$\Delta x_{SP} = K\sigma + X_L - X_0 \quad (16)$$

Many of the values of the components are best determined empirically. Means may be provided for calibration, testing and adjustment. For example, a switch 418 may be provided to switch the input of the gate circuit 102 from the detection signal on the conductor 64 to a standard calibration signal which may be a fixed d.c. voltage. A switch 420 may be provided to switch the input of the timing circuit 106 from the timing pulses on the conductor 68 to a standard periodic signal, which may be supplied by an oscillator 422. A switch 424 may be provided to switch the input of the standard deviation computing circuit 72 from the measurement signal on the conductor 70 to a standard calibration signal, which may be supplied by an oscillator 426. A switch 428 may be provided to switch the output of the reject limit circuit to ground. The signals thereupon developed at various test points can then be measured and various of the components adjusted to provide the test point signals appropriate for calibration of the circuit.

Various modifications may be made in the circuitry within the scope of the present invention. For example, the circuitry for a process having a low reject limit has been described with particularity. Without changing the principles of operation, corresponding circuitry can be provided for a process having a high reject limit. Further, the reject limit as set by the reject limit circuit 88 need not be the same reject limit as utilized by the sorter 50, and indeed, it is not necessary that any part of the product actually be rejected. In other words, "reject limit" is merely a convenient way of identifying a particular magnitude of the measured property used as a control limit. The reject limit signal from the automatic target managment system 62 need not represent offset $\Delta x_{SP}$ but may represent the set point $x_{SP}$ itself as may be achieved by making the reject limit circuit 88 provide a reject limit signal corresponding to the low limit $X_L$ rather than its difference $\Delta X_L$ from the nominal set point $X_0$.

Various other modifications also may be made within the scope of the invention.

What is claimed is:

1. Apparatus for determining the statistical dispersion of a measured property of successive units of processed material comprising a detector of the property of said processed material for producing detection signals systematically related to said property, integrating means for integrating said detection signals over successive intervals corresponding to respective units of processed material to develop measurement signals, means for measuring the speed of said processed materials by producing a speed signal indicative of said speed, compensating means responsive to said speed signal for compensating said measurement signals for changes in speed, first discriminator means for comparing measurement signals indicative of said property to a first threshold signal and producing a first discriminator output signal indicative of whether or not said measurement signals exceed said first threshold signal, first feedback means responsive to said first discriminator output signal for producing said first threshold signal at such level as to cause a first predetermined fraction of said measurement signals to exceed said first threshold signal, second discriminator means for comparing said measurement signals to a second threshold signal and producing a second discriminator output signal indicative of whether or not said measurement signals exceed said second threshold signal, second feedback means responsive to said second discriminator output signal for producing said second threshold signal at such level as to cause a second predetermined fraction of said measurement signals to exceed said second threshold signal, and combining means for differentially combining said first and second threshold signals to produce a dispersion signal indicative of the dispersion of said measured property.

2. Apparatus according to claim 1 wherein said first and second predetermined fractions are approximately equally and oppositely displaced from 0.5.

3. Apparatus according to claim 2 wherein said first predetermined fraction is about 0.16 and said second predetermined fraction is about 0.84, whereby said combined signal represents twice the standard deviation.

4. Apparatus for determining the statistical dispersion of a measured property of successive units of processed material comprising first discriminator means for comparing measurement signals indicative of said property to a first threshold signal and producing a first discriminator output signal indicative of whether or not said measurement signals exceed said first threshold signal, first feedback means responsive to said first discriminator output signal for producing said first threshold signal at such level as to cause a first predetermined fraction of said measurement signals to exceed said first threshold signal, second discriminator means for comparing said measurement signals to a second threshold signal and producing a second discriminator output signal indicative of whether or not said measurement signals exceed said second threshold signal, second feedback means responsive to said second discriminator output signal for producing said second threshold signal at such level as to cause a second predetermined fraction of said measurement signals to exceed said second threshold signal, and combining means for differentially combining said first and second threshold signals to produce a dispersion signal indicative of the dispersion of said measured property, wherein each of said first and second discriminator means produces a respective discriminator output signal at one respective fixed level when said measurement signals exceed the respective threshold signal and at another respective fixed level when said measurement signals are less than the respective threshold signal, and wherein each of said feedback means averages the respective discriminator output signal with respect to time and includes means for offsetting the averaged signal by an amount equal to the magnitude of the averaged signal when the fraction of said measurement signals exceeding the respective threshold signal equals the respective predetermined fraction.

5. In combination with apparatus for automatically processing successive units of material wherein the processing is controlled to produce successive units having a property near a set point, an automatic target management system wherein the property of successive units of processed material is measured to produce measurement signals indicative of said property and such measurement signals are utilized to control the set point to maintain said property near a limit, the improvement comprising first discriminator means for comparing said measurement signals to a first threshold signal and producing a first discriminator output signal indicative of whether or not said measurement signals exceed said first threshold signal, first feedback means responsive to said first discriminator output signal for producing said first threshold signal at such level as to cause said measurement signals to exceed said first threshold signal a first predetermined fraction of the time, second discriminator means for comparing said measurement signals to a second threshold signal and producing a second discriminator output signal indicative of whether or not said measurement signals exceed said second threshold signal, second feedback means responsive to said second discriminator output signal for producing said second threshold signal at such level as to cause said measurement signals to exceed said second threshold signal a second predetermined fraction of the time, first combining means for differentially combining said first and second threshold signals to produce a dispersion signal indicative of the statistical dispersion of said measured quality, means for producing a limit signal corresponding to said limit, second combining means for additively combining a signal proportional to said dispersion signal and said limit signal to produce a set-point signal, and means for utilizing said set-point signal to control said set point.

6. In combination with apparatus for automatically continuously processing successive units of material wherein the processing is continuously controlled to produce successive units having a property near a set point, an automatic target management system comprising measuring means for measuring the property of successive units of processed material to produce measurement signals indicative of said property independent of the speed of said processing, first discriminator means for comparing said measurement signals to a first threshold signal and producing a first discriminator output signal indicative of whether or not said measurement signals exceed said first threshold signal, first feedback means responsive to said first disciminator output signal for producing said first threshold signal at such level as to cause said measurement signals to exceed said first threshold signal a first predetermined fraction of the time, second discriminator means for comparing said measurement signals to a second threshold signal and producing a second discriminator output signal indicative of whether or not said measurement signals exceed said second threshold signal, second feedback means responsive to said second discriminator output signal for producing said second threshold signal at such a level as to cause said measurement signals to exceed said second threshold signal a second predetermined fraction of the time, first combining means for differentially combining said first and second threshold signals to produce a dispersion signal indicative of the statistical dispersion of said measured property, differentially means for producing a limit signal corresponding to a limit of said property, second combining means for additively combining a signal proportional to said dispersion signal and said limit signal to produce a set-point signal, and means for utilizing said set-point signal to control said set point.

7. Apparatus according to claim 6 wherein said measuring means comprises a detector of the property of said processed material for producing detection signals systematically related to said property, integrating means for integrating said detection signals over successive intervals corresponding to respective units of processed material to develop measurement signals, means for measuring the speed of said processed materials by producing a speed signal indicative of said speed, and compensating means responsive to said speed signal for compensating said measurement signals for changes in speed.

8. Apparatus according to claim 7 wherein said compensating means equalizes the total duration of integration in the respective intervals.

9. Apparatus according to claim 8 wherein said compensating means divides each integration period into segments substantially uniformly distributed over a respective interval.

10. Apparatus according to claim 9 wherein said measuring means includes means for applying the compensated measuring signal corresponding to one interval to said first and second discriminator means while the compensated measuring signal for the next succeeding interval is being developed.

11. Apparatus according to claim 1 including a meter responsive to said dispersion signal for indicating standard deviation.

12. A system for continuously controlling processing apparatus for automatically continuously processing successive units of moving material, said system comprising a detector of a property of said processed material for producing detection signals systematically related to said property as said material moves by, integrating means for integrating said detection signals to develop measurement signals, timing means responsive to the movement of said material for synchronizing said integrating means to integrate over intervals corresponding to respective units of processed material, means coupled to said timing means for holding a measurement signal developed in said interval corresponding to a respective one of said units of processed material while said integrating means develops the measuring signal in the interval corresponding to the succeeding one of said units, detector gating means controlled by detector gating signals for applying said detection signals to said integrating means only upon application of said detector gating signals, means for measuring the speed of said processed material by producing a speed signal of magnitude inversely proportional to speed, compensating means responsive to said speed signal for producing said detector gating signals periodically at a frequency high relative to the normal rate of movement of said units of processed material by said detector for durations of time inversely proportional to said speed signal, whereby said measurement signals are independent of the speed of the material through the processing apparatus, and means responsive to said measurement signals for controlling said processing apparatus.

13. The system according to claim 12 wherein said compensating means includes means for producing an offset signal, second gating means controlled by second gating signals for passing said speed signal only upon application of said second gating signals, integrating means responsive to said offset signal and said passed speed signal for comparing said offset signal and the average of said passed speed signal by producing a comparison signal indicative of their relative magnitude, oscillator means for producing a periodic oscillator signal at a said frequency, comparison means responsive to said comparison signal and said oscillator signal for comparing said comparison signal and said oscillator signal by producing control signals on respective cycles of said oscillator signal whenever said oscillator signal has a particular magnitude relative to said comparison signal, means for applying said control signals to said second gating means as said second gating signals, whereby the duration of each control signal and second gating signal is inversely proportional to said speed signal, and means for applying said control signals to said detector gating means as said detector gating signals.

14. A system for continuously controlling a cigarette making machine automatically continously processing a continuous tobacco stream into individual cigarettes, said system comprising a beta gauge for producing detection signals systematically relates to the mass per unit length of said tobacco stream as said stream moves by, integrating means for integrating said detection signals to develop measurement signals, timing means responsive to the production of individual cigarettes for synchronizing said integrating means to integrate over intervals corresponding to individual cigarettes, means coupled to said timing means for holding a measurement signal developed in said interval corresponding to a respective cigarette while said integrating means develops the measuring signal in the interval corresponding to the succeeding cigarette, detector gating means controlled by detector gating signals for applying said detection signals to said integrating means only upon application of said detector gating signals, means for measuring the speed of said processed materials by producing a speed signal of magnitude inversely proportional to speed, compensating means responsive to said speed signal for producing said detector gating signals periodically at a frequency high relative to the normal rate of production of cigarettes for durations of time inversely proportional to said speed signal, whereby said measurement signals are independent of the speed of the tobacco stream through the processing apparatus, first discriminator means for comparing said measurement signals to a first threshold signal and producing a first discriminator output signal indicative of whether or not said measurement signals exceed said first threshold signal, first feedback means responsive to said first discriminator output signal for producing said first threshold signal at such level as to cause said measurement signals to exceed said first threshold signal a first predetermined fraction of the time, second discriminator means for comparing said measurement signals to a second threshold signal and producing a second discriminator output signal indicative of whether or not said measurement signals exceed said second threshold signal, second feedback means responsive to said second discriminator output signal for producing said second threshold signal at such level as to cause said measurement signals to exceed said second threshold signal a second predetermined fraction of the time, first combining means for differentially combining said first and second threshold signals to produce a dispersion signal indicative of the statistical dispersion of said mass per unit length, means for producing a limit signal corresponding to a predetermined limit of mass per unit length, second combining means for additively combining a signal proportional to said dispersion signal and said limit signal to produce a set-point signal, and means for utilizing said set-point signal to control said set point.

15. A method of continuously controlling the automatic continuous processing of successive units of material to produce successive units having a property near a set point comprising measuring the property of successive units of processed material to produce measurement signals indicative of said property, applying said measurement signals and a first threshold signal to a first discriminator which produces a first discriminator output signal indicative of whether or not said measurement signals exceed said first threshold signal, in response to said first discriminator output signal producing said first threshold signal applied to said first discriminator at such level as to cause said measurement signals to exceed said first threshold signal a first predetermined fraction of the time, simultaneously applying said same measurement signals and a second threshold signal to a second discriminator which produces a second discriminator output signal indicative of whether or not said measurement signals exceed said second threshold signal, in response to said second discriminator output signal producing said second threshold signal applied to said second discriminator at such level as to cause said measurement signals to exceed said second threshold signal a second predetermined fraction of the time, said second predetermined fraction being substantially different from said first predetermined fraction, differentially combining said first and second threshold signals to produce a dispersion signal indicative of the statistical dispersion of said measured property, producing a limit signal corresponding to a limit of said property, additively combining a signal proportional to said dispersion signal and said limit signal to produce a set-point signal, and utilizing said set-point signal to control said set-point.

16. The method according to claim 15 wherein said measuring step comprises detecting the property of said processed material by producing detection signals systematically related to said property, integrating said detection signals over successive intervals corresponding to respective units of processed material to develop measurement signals, and compensating said measurement signals for changes in speed of said processed materials.

17. The method according to claim 16 wherein the total duration of integration in the respective intervals is equalized.

18. The method according to claim 17 wherein each integration period is divided into segments substantially uniformly distributed over a respective interval.

19. The method according to claim 18 wherein the compensated measuring signal corresponding to one interval is compared to said first and second threshold signals while the compensated measuring signal for the next succeeding interval is being developed.

20. A method for continuously controlling processing apparatus for automatically continuously processing successive units of moving material, said method comprising detecting a property of said processed material by producing detection signals systematically related to said property as said material moves by, integrating said detection signals over a plurality of periods of time substantially equally distributed over an integrating interval, each such period of time being proportional to the speed of said processed material, thereby developing measurement signals independent of the speed of the material through the processing, synchronizing said integration to integrate over integrating intervals corresponding to respective units of processed material, holding a measurement signal developed in an integrating interval corresponding to a respective one of said units of processed material while developing the measuring signal in the interval corresponding to the succeeding one of said units, and utilizing said measurement signals to control said processing apparatus.

21. Apparatus according to claim 1 wherein said compensating means equalizes the total duration of integration in the respective intervals.

22. Apparatus according to claim 21 wherein said compensating means divides each integration period into segments substantially uniformly distributed over a respective interval.

23. Apparatus according to claim 22 wherein said measuring means includes means for applying the compensated measuring signal corresponding to one interval to said first and second discriminator means while the compensated measuring signal for the next succeeding interval is being developed.

* * * * *